United States Patent [19]

Pesonen

[11] 3,942,603
[45] Mar. 9, 1976

[54] AUTOMATIC VEHICLE-STOPPING STRUCTURE

[75] Inventor: Tapio Pesonen, Tampere, Finland
[73] Assignee: Valmet Oy, Finland
[22] Filed: Dec. 4, 1974
[21] Appl. No.: 529,577

[30] Foreign Application Priority Data
Dec. 5, 1973 Finland .............................. 3752/73

[52] U.S. Cl. .......................... 180/92; 180/95; 293/4
[51] Int. Cl.² ........................................... B60T 7/12
[58] Field of Search .............................. 293/2–8; 180/92–96; 200/61.23, 61.24, 61.44, 83 Z, 81 H, 81.4, 81.5

[56] References Cited
UNITED STATES PATENTS

| | | | |
|---|---|---|---|
| 1,784,387 | 12/1930 | Postel | 180/92 |
| 1,925,763 | 9/1933 | Kirschen | 293/4 X |
| 2,584,078 | 1/1952 | Hsi-Yu | 180/95 |
| 3,459,954 | 8/1969 | Sgorbani | 200/83 Z |
| 3,695,665 | 10/1972 | Matsuura | 180/92 X |
| R15,467 | 10/1922 | Schauman | 180/95 |

FOREIGN PATENTS OR APPLICATIONS

| | | | |
|---|---|---|---|
| 1,162,176 | 9/1958 | France | 180/94 |

*Primary Examiner*—Philip Goodman
*Assistant Examiner*—Terrance L. Siemens
*Attorney, Agent, or Firm*—Steinberg & Blake

[57] ABSTRACT

An automatic vehicle-stopping structure according to which a vehicle body carries at an outermost part, which leads the remainder of the vehicle body when the latter travels in a given direction, a container which contains a fluid and which has most distant from the outermost part of the vehicle body a flexible wall to be engaged and deformed by a person or object which comes into contact with the fluid-container during travel of the vehicle. The interior of the container communicates with a pressure-responsive switch. The latter switch changes from one position to another in response to deformation of the flexible wall of the container. When the switch changes its position automatically in this manner, it actuates at least a control for engaging the brakes of the vehicle so that the vehicle will be automatically stopped under the above conditions.

3 Claims, 5 Drawing Figures

AUTOMATIC VEHICLE-STOPPING STRUCTURE

BACKGROUND OF THE INVENTION

The present invention relates to vehicles.

In particular, the present invention relates to structures for automatically stopping the movement of a vehicle when the vehicle engages a person or object situated in the path of travel of the vehicle In particular, the present invention relates to a structure which will automatically trigger a brake such as an emergency brake of the vehicle for automatically engaging the latter while the present invention also may include a structure for automatically disengaging the drive from the engine of the vehicle when the vehicle strikes against a person or object during travel of the vehicle.

The invention is particularly applicable to large vehicles adapted to carry and transport relatively heavy loads such as, for example, straddle truck, mobile cranes, and C wagons. Vehicles of this latter type have a cab for accommodating the operator of the vehicle. Because of the large size of such vehicles and because the operator's cab is generally situated at the highest part of the vehicle, the operator of the vehicle has very poor visibility particularly with respect to persons and objects which are relatively close to the vehicle. This latter factor has a particularly dangerous effect with respect to personnel in the vicinity of the vehicle. Moreover, because of the relatively confined visibility, the vehicle is very likely to collide with walls, doors, or other obstacles and objects in the path of travel of the vehicle, particularly when the vehicle is travelling in a confined narrow space.

In connection with straddle trucks, a number of fatal accidents have occurred when the operator of the straddle truck sets the vehicle into motion without noticing an individual standing beside a wheel of the straddle truck, with the result that such an individual was run over.

Of course, the above problem has been recognized and attempts have already been made to find a solution thereto. According to the prior art structures for triggering emergency brakes under conditions such as those set forth above, it has been conventional to use various types of linkage mechanisms to serve as a pick-up means which will automatically sense the presence of a person or object. Such a pick-up means conventionally takes the form of an arm which is displaced upon impact, or such a pick-up means may take the form of a plate which is similarly displaced upon colliding with a person or object. However, such conventional constructions have the drawback of being unreliable in operation and of having an insufficient sensitivity. The unreliability of the operation results from the fact that the linkage members become bent while at the same time considerable amount of wear takes place at the pivots thereof while the presence of foreign objects, such as ice and snow, also detract from the operating effectiveness of such linkages.

SUMMARY OF THE INVENTION

It is accordingly a primary object of the present invention to provide a safety structure which will avoid the above drawbacks.

In particular, it is an object of the present invention to provide vehicles of the above type with the capability of operating with increased safety, as contrasted with conventional safety devices of the above type, in order to reliably prevent or at least substantially reduce collisions or the damage caused thereby when various types of transport vehicles are operated.

It is in particular an object of the present invention to provide a device of the above general type which is far more sensitive than conventional devices for bringing about an automatic engaging of the brakes of the vehicle while it is also possible in addition, in accordance with the object of the invention, to disengage the drive from the engine of the vehicle.

Moreover, it is an object of the present invention to provide a safety device of the above general type which is capable of operating effectively even under severe operating conditions as under conditions where snow and ice are encountered in such a way that they would prevent proper operation of conventional devices.

In addition it is an object of the present invention to provide a safety structure of the above general type which is capable of reliably responding, to engage at least the brakes of the vehicle, not only when the vehicle travels slowly or starts from a stopped condition within the confines of a storehouse or the like, but also when the vehicle travels outside along a road or the like wher the device of the invention is capable of responding to the presence of a snowbank along the side of the road, for example, to prevent the vehicle from ditching or driving off the road.

According to the invention the vehicle has a vehicle body provided with an outermost part which leads the remainder of the vehicle when the vehicle travels in a given direction. This outermost part of the vehicle body carries a fluid-containing means which has most distant from the outermost part of the vehicle a flexible wall to be engaged and deformed by a person or object situated in the path of travel of the vehicle. A pressure-responsive switch means communicates with the interior of the fluid-containing means for automatically moving from one position to another when the flexible wall is deformed under conditions such as those set forth above. When this pressure-responsive switch means thus moves automatically from its one to its other position, through a suitable circuit means it causes electrical actuation of a brake-control means of the vehicle which effectively engages the brakes thereof in order to stop the movement of the vehicle automatically.

Thus, in accordance with the invention outermost parts of the vehicle, which are outermost as considered in the direction of travel of the vehicle, such as wheel fenders, carry a pick-up for an emergency brake trigger, this pick-up having at least an outer wall which is elastic with the pick-up having in its interior an air space which communicates with a pressure wave switch, forming the above pressure-responsive switch means, so that a change in the volume of this air space of the fluid-containing means results from an impact against the outer wall of the pick-up. In this way such a pressure wave switch will sense a collision with a person or object, and the pressure wave switch automatically changes its switching state in order to trigger the brakes of the vehicle while also, preferably, disengaging the drive from the engine of the vehicle.

BRIEF DESCRIPTION OF DRAWINGS

The invention is illustrated by way of example in the accompanying drawings which form part of this application and in which.

DESCRIPTION OF PREFERRED EMBODIMENTS

It is to be noted that while in the description which follows the invention is described with respect to a straddle carrier, the invention is also suitable for use with other vehicles, particularly those which are designed to operate in a relatively confined area, such as mobile cranes, C waggons, and the like, with the invention also being in general applicable to trucks. The safety-promoting effect of the emergency-brake triggering system according to the present invention is greatest in connection with starting from a rest or stopped position of the vehicle as well as when travelling at relatively low speeds. In some cases, however, the safety system of the invention is capable of preventing ditching of the vehicle or preventing it from driving off the road as when the pick-up or fluid-containing means, described below, engages with its flexible exterior wall a snowbank at the roadside, for example.

Figure 1:
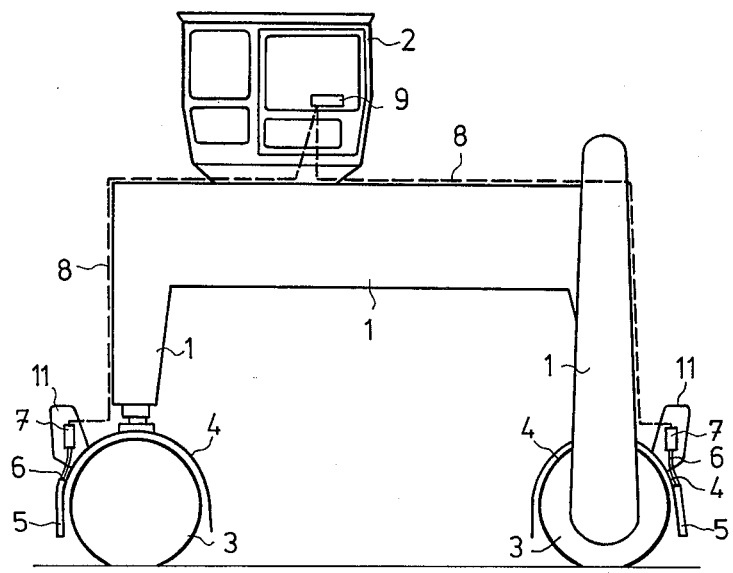
FIG. 1 is a schematic side elevation of a straddle carrier provided with the safety structure of the invention.
Figure 2:
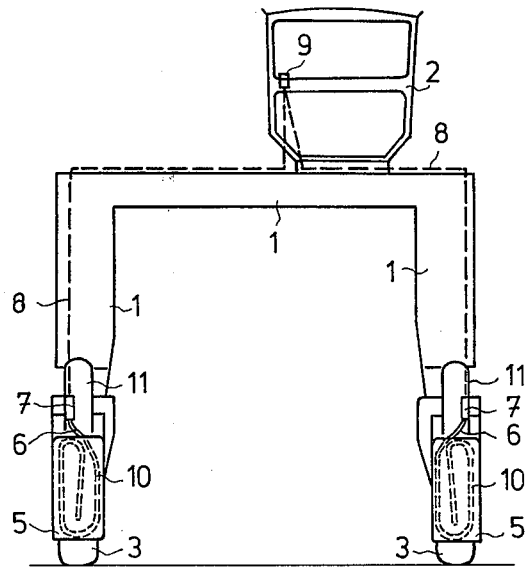
FIG. 2 is a front elevation of the straddle carrier of FIG. 1.

Referring now to FIGS. 1 and 2, the straddle carrier illustrated therein includes a vehicle body 1 which defines within itself a space for a load which is to be transported in a well known manner, this load being, for example, a load of containers. The upper part of the vehicle body 1 carries a cab 2 for the operator of the vehicle. As is well known, from this cab 2 there is only a restricted visibility particularly of the immediate environment of the vehicle, so that there is an obvious risk of accidents and collisions with respect to persons and objects which are close to the vehicle. The straddle carrier has at each of its four corners a wheel 3 provided with a wheel guard or fender 4 which partly surrounds each wheel as illustrated.

As is apparent from FIG. 1, the left and right lower end regions of the left and right fenders 4 which are visible in FIG. 1 form the outermost parts of the vehicle body, this being true for the pair of fenders which are visible in FIG. 1 as well as for the pair of fenders which are behind those which are visible in FIG. 1. Thus with the illustrated vehicle it is the lower outermost portions of the fenders which form the outermost parts of the vehicle when the latter travels forwardly or rearwardly. Each of these outermost parts of the vehicle body fixedly carries a fluid-containing means 5 which forms a pick-up for detecting collision between the vehicle and a person or object. The fluid-containing means 5 has an interior space which encloses a given volume of air, which thus forms the fluid which is contained by the fluid-containing means. This air which is under normal atmospheric pressure communicates at each of the fluid-containing means 5 through a pipe or tube 6 with a pressure-wave or pressure-responsive switch means 7. Such pressure-responsive switches 7 are well known. Such a switch carries in its interior a sensitive membrane which moves even under the effect of minute changes of pressure, and this movement of the membrane causes the opening and/or closing of an electrical switch. The sensitivity of such a membrane and its rate of return to rest are usually adjustable.

Figure 3:
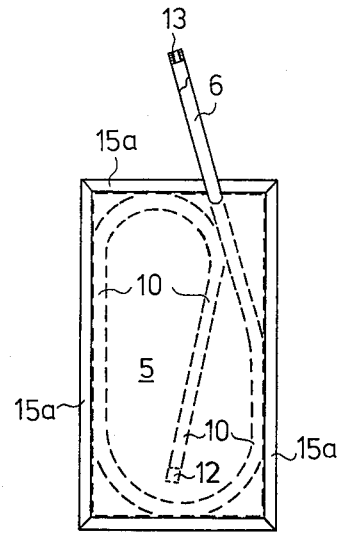
FIG. 3 is a front elevation showing in greater detail than FIGS. 1 and 2 a fluid-containing means which is adapted to respond to a collision with a person or obejct for providing a suitable signal.
Figure 4:
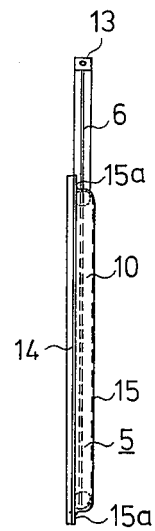
FIG. 4 is a side elevation of the fluid-containing means of FIG. 3.

The details of one possible embodiment of a fluid-containing means of the invention are illustrated in FIGS. 3 and 4. Thus, the volume of air which communicates with the pressure-responsive switch means 7 is situated in the interior of a length of elastic rubber tubing 10. This elastic rubber tubing 10 has a closed end 12 and forms a continuation of the tube or pipe 6 which has an open end 13 opposite to the closed end 12. This open end 13 is connected by a suitable coupling, such as a relatively thin-walled plastic tube, to the pressure connection of the pressure-responsive switch means 7. The rubber tube 10 has been set at an angle so as to have the somewhat sinuous configuration most apparent from FIG. 3.

The fluid-containing means of the invention further includes an inner wall 14 forming a base plate which has its inner surface directly fixed in any suitable way to the outer lower surface region of a fender 4 as described above. The rubber tube 10 is fixed to the outer surface of the inner wall 14, which may be made, for example, of rubber, as by being cemented thereto. Over the rubber tube 10 is stretched a further elastic rubber membrane 15 which is cemented at its edges 15a to the periphery of the plate or base 14 while extending around the place where the tubes 10 and 6 form continuations of each other so that the tube 6 can extend out of the space defined between the inner wall 14 and the stretched elastic membrane 15 which also may be made of a suitable rubber, for example. This exterior rubber sheet 15 forms a flexible, elastic, impact-sensitive outer wall of the fluid-containing means, and this flexible wall 15 is adapted to be deformed upon engaging a person or object situated in the path of movement of the vehicle. Even if an extremely light impact is received by the rubber membrane 15 at any part thereof, there will be a sufficient change in the volume of the air space within the tube 10 to provide a pressure pulse which is detected by the pressure-responsive switch means 7 which under these conditions automatically responds to change from one position to another.

As has been indicated in FIGS. 1 and 2, the plurality of pressure-responsive switch means 7 are situated within housings 11 of the lamps of the straddle carrier so that the switches 7 are mechanically protected. Electrical leads extend from the pressure-responsive switches 7, these leads being schematically indicated by the dotted lines 8 in FIGS. 1 and 2. The leads 8 serve to electrically connect the several pressure-responsive switch means 7 with a control unit 9 for controlling the triggering of the emergency brakes, this control unit 9 being situated in the cab 2, as shown in FIGS. 1 and 2. While FIGS. 1 and 2 show the several fenders 4 respectively carrying the fluid-container means 5, so that one of the latter is carried by each fender 4, it may in some cases be advantageous to provide additional fluid-container means 5 at other locations such as, for example, the lower region of each fender 4 which is opposed to the region thereof which carries a fluid-container means 5. In such a case each of the lower end regions of each fender 4 will have a fluid-container means electrically connected with a pressure-responsive switch means, so that in this way added safety may be achieved since such inner lower parts of the fenders 4 may engage objects of individuals when the vehicle executes turns.

Figure 5:
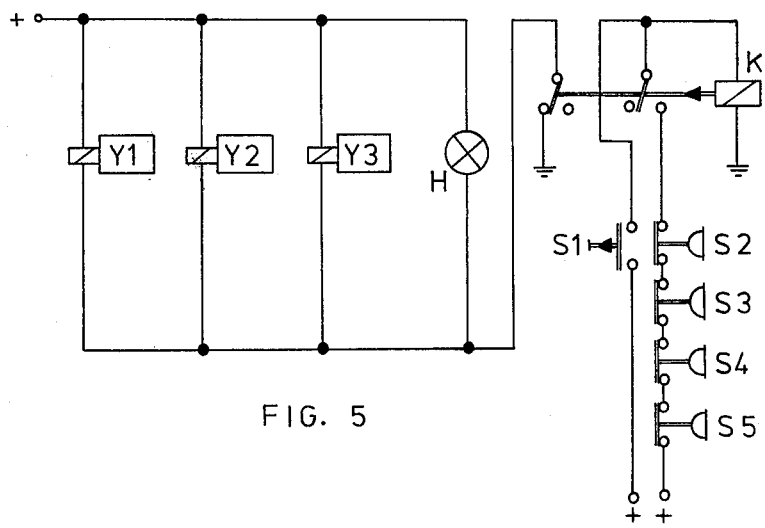
FIG. 5 is a wiring diagram of an electrical circuit which includes the structure of the invention as well as parts of the vehicle which are controlled by the safety structure of the invention.

In the simplified wiring diagram which is shown in FIG. 5, there is illustrated a holding relay means K having a pair of switches normally in the position illustrated in FIG. 5 when the relay K is unenergized. FIG. 5 schematically illustrates a magnetic valve Y1 which controls the engagement or disengagement of the drive from the engine of the vehicle to the transmission thereof, so that the unit Y1 forms an electrical control means for controlling engagement and disengagement of the drive of the vehicle. In a similar manner, magnetic valves y2 and Y3 are provided to form electrical control means for controlling engagement and disengagement of the brakes of the vehicle. There are a pair of such electrical brake-control means Y2 and Y3 inasmuch as in the illustrated system the vehicle has dual circuit brakes.

The several pressure-responsive switch means 7 are connected in series as respectively indicated at S2–S5, so that the several pressure-responsive switches form a series circuit as illustrated in FIG. 5. The circuit further includes a pilot lamp H as well as a manually operable switch means S1 situated at the control unit 9 and capable of being closed, at least momentarily, by the operator in order to release the brakes and enable the vehicle drive to be engaged.

This electrical circuit means is such that when, prior to starting the engine, the current for operating the entire straddle carrier is switched on, the magnetic valves Y1, Y2, and Y3 are energized through the left relay switch shown in FIG. 5, which has at this time the position illustrated in FIG. 5, so that at this time the energized control means Y1 prevents engagement of the engine drive while the energized control means Y2, Y3 prevents disengagement of the brakes, and of course the pilot lamp H is illuminated. At this time the relay means K is not yet energized so that it does not attract its armature. Thus, prior to starting the engine the emergency brakes are engaged to act also as parking brakes, the magnetic valves Y2 and Y3 being energized, while at the same time the drive cannot be transmitted from the engine to the transmission because the engine-engagement control means Y1 is also energized.

Prior to setting the vehicle in motion, the operator will release the brakes momentarily by manually closing the switch means S1, which is under the control of a spring-loaded pressure button, so that immediately upon release by the operator the closed switch S1 will automatically open. The closing of the switch S1 will energize the coil of the relay K which thus will now receive current so that the relay operates to changeover its switches. As a result the brakes become disengaged and the engine drive can be connected with the transmission. Once the relay K is energized, it remains energized, acting as a holding relay, as a result of the fact that the circuit is now completed through the coil by way of the series circuit formed by the several pressure-responsive switch means S2–S5. The latter pressure-responsive switches are normally closed.

Assuming now that there is an impact between one of the fluid-containing means 5 and a person or object, then the deformation of the elastic wall 15, which need only be a relatively slight deformation, will cause within the tube 10 a sufficient change in volume to cause the pressure-responsive switch means which is connected with the particular fluid-containing means to respond and become automatically displaced from its closed to its open position. As a result, the circuit which maintains the relay K energized will open, causing the relay to become deenergized and causing the relay switches automatically to return to the condition illustrated in FIG. 5. As a result the several magnetic valves Y1, Y2, and Y3 become energized by drawing the current through the left relay switch illustrated in FIG. 5. There is, therefore, an automatic emergency braking action accompanied by an automatic disengagement of the engine drive from the transmission, while at the same time the signal lamp H becomes illuminated.

Thus, the vehicle has been automatically stopped. The operator will take the precaution of checking the cause of and identifying the source of the impact, and assuming that conditions are satisfactory for continued operation, the operator will again close the switch S1 so as to repeat the above operations and the vehicle can continue to travel. The brakes, which obtain their operating pressure through the magnetic valves Y2 and Y3, are most appropriately used also as the driving brakes for the straddle carrier. Further description of these brakes and their hydraulic circuits is not required inasmuch as such brakes are commonly known and are of a conventional type.

What is claimed is:

1. In a vehicle, a vehicle body having an outermost part which leads the remainder of the vehicle when the vehicle travels in a given direction, fluid-containing means carried by said outermost part of said vehicle body and projecting outwardly from the same so that said fluid-containing means will engage a person or object situated in the path of travel of the vehicle when the latter travels in said given direction, said fluid-containing means having at its region which is most distant from said outermost part of said vehicle body a flexible wall for engaging a person or object in said path of travel of the vehicle to be deformed by such a person or object for automatically changing the interior volume of said fluid-containing means, pressure-responsive electrical switch means communicating with the fluid of said fluid-containing means for responding to said change of volume when said flexible wall is deformed by engaging a person or object, and said pressure-responsive switch means when thus responding changing from one position to another position in an automatic manner, electrical brake-control means carried by the vehicle for controlling the brakes thereof, and electrical circuit means electrically connected between said electrical brake-control means and said pressure-responsive switch means for automatically actuating said brake-control means to engage brakes of the vehicle when said switch means moves from said one to said other position thereof in response to deformation of said flexible wall of said fluid-containing means by a person or object, said fluid-containing means including at least an elongated flexible tube which is closed at one end and which at its opposite end communicates with said pressure-responsive switch means, said tube being made of an elastic flexible material, and said fluid-containing means including an inner wall fixedly carried by said outermost part of the vehicle body, said tube engaging an outer surface of said inner wall which is directed away from said outermost part of said vehicle body, and an elastic membrane covering said tube at least partly at a portion thereof engaging said outer surface of said inner wall, said membrane having a peripheral region fixed to said inner wall and being stretched over said tube for forming said flexible wall which when deformed by a person or object will cause fluid in said tube to actuate said pressure-responsive switch means.

2. The combination of claim 1 and wherein the fluid contained by said fluid-containing means is air.

3. In a vehicle, a vehicle body having an outermost part which leads the remainder of the vehicle when the vehicle travels in a given direction, fluid-containing means carried by said outermost part of said vehicle body and projecting outwardly from the same so that said fluid-containing means will engage a person or object situated in the path of travel of the vehicle when the latter travels in said given direction, said fluid-containing means having at its region which is most distant from said outermost part of said vehicle body a flexible wall for engaging a person or object in said path of travel of the vehicle to be deformed by such a person or object for automatically changing the interior volume of said fluid-containing means, pressure-responsive electrical switch means communicating with the fluid of said fluid-containing means for responding to said change of volume when said flexible wall is deformed by engaging a person or object, and said pressure-responsive switch means when thus responding changing from one position to another position in an automatic manner, electrical brake-control means carried by the vehicle for controlling the brakes thereof, and electrical circuit means electrically connected between said electrical brake-control means and said pressure-responsive switch means for automatically actuating said brake-control means to engage brakes of the vehicle when said switch means moves from said one to said other position thereof in response to deformation of said flexible wall of said fluid-containing means by a person or object, said vehicle body having a plurality of outermost parts any one of which will lead the remainder of the vehicle body depending upon the direction of travel thereof, a plurality of said fluid-containing means being respectively carried by said outermost parts of the vehicle body for having their flexible walls deformed by a person or object engaging any one of said flexible walls, a plurality of said pressure-responsive switch means respectively communicating with said plurality of fluid-containing means, said plurality of switch means being normally closed and connected in series to form a series circuit which opens when any one of said switch means respond to deformation of a flexible wall of a fluid-containing means communicating therewith, a manually operable switch means being connected in parallel with said series circuit to be closed by the vehicle operator for actuating said brake-control means to release the vehicle brakes, and holding relay means forming part of said circuit means together with said manually operable switch means and said series circuit, said holding relay means responding to closing of said manually operable switch means for placing said series circuit in a condition for releasing said holding relay means in response to opening of any one of said plurality of pressure-responsive switch means, said holding relay means being electrically connected with said brake-control means for actuating the latter to engage the brakes of the vehicle when said holding relay means is released upon opening of one of said plurality of pressure-responsive switch means.

* * * * *